US012561783B2

(12) United States Patent
Hasegawa

(10) Patent No.: US 12,561,783 B2
(45) Date of Patent: Feb. 24, 2026

(54) ABNORMALITY DETECTION DEVICE, ABNORMALITY DETECTION METHOD, AND ABNORMALITY DETECTION SYSTEM

(71) Applicant: KOKUSAI DENKI Electric Inc., Tokyo (JP)

(72) Inventor: Keigo Hasegawa, Tokyo (JP)

(73) Assignee: KOKUSAI DENKI Electric Inc., Tokyo (JP)

( * ) Notice: Subject to any disclaimer, the term of this patent is extended or adjusted under 35 U.S.C. 154(b) by 308 days.

(21) Appl. No.: 18/022,427

(22) PCT Filed: Sep. 25, 2020

(86) PCT No.: PCT/JP2020/036301
§ 371 (c)(1),
(2) Date: Feb. 21, 2023

(87) PCT Pub. No.: WO2022/064639
PCT Pub. Date: Mar. 31, 2022

(65) Prior Publication Data
US 2023/0342903 A1 Oct. 26, 2023

(51) Int. Cl.
*G06T 7/00* (2017.01)

(52) U.S. Cl.
CPC .................................. *G06T 7/0004* (2013.01)

(58) Field of Classification Search
CPC .................. G06T 7/0004; G06T 7/0002; G06T 2207/10016; G06T 2207/10024; G06T 2207/20021
USPC ................................................. 382/103, 100
See application file for complete search history.

(56) References Cited

U.S. PATENT DOCUMENTS

2018/0253850 A1* 9/2018 Kawai ...................... G06T 7/11
2020/0089999 A1 3/2020 Zargahi

FOREIGN PATENT DOCUMENTS

| CN | 105574871 A | | 5/2016 |
| CN | 108109145 A | | 6/2018 |
| JP | 2009079979 A | * | 4/2009 |
| JP | 2011-096081 A | | 5/2011 |

(Continued)

OTHER PUBLICATIONS

European Patent Office, Extended European Search Report, Application No. 20955233.0, dated Jun. 17, 2024, in 52 pages.

(Continued)

*Primary Examiner* — Sheela C Chawan
(74) *Attorney, Agent, or Firm* — PROCOPIO, CORY, HARGREAVES & SAVITCH LLP

(57) ABSTRACT

A technique is provided for detecting the presence or absence of an abnormality with respect to an object appearing in a target image with high accuracy without using AI, even in an environment in which luminance values and colors are likely to fluctuate. An abnormality detection device (230) includes: an image input unit (232) for inputting an input image indicating an abnormality detection target object; a gradient distribution generation unit (234) for dividing the input image into predetermined regions and generating, for each region, a gradient distribution that indicates a distribution of a luminance gradient direction of the region; and an abnormality determination unit (236) for determining the presence or absence of an abnormality by analyzing the gradient distribution generated for each region.

19 Claims, 9 Drawing Sheets

(56) References Cited

FOREIGN PATENT DOCUMENTS

| | | | |
|---|---|---|---|
| JP | 2014-010544 A | 1/2014 | |
| JP | 2019-003575 A | 1/2019 | |
| JP | 2020-046928 A | 3/2020 | |
| KR | 2019078685 A * | 7/2019 | ............ G06F 11/008 |

OTHER PUBLICATIONS

"AI is the Key to Solving the Problem of How to Inspect Transmission Lines Spanning a Total Length of Approximately 14,000 km," Oct. 25, 2018; and an English machine translation thereof.

Nikkei Business "Maintenance Development of track circuit sending/ receiving bond abnormality judgment device" May 31, 2017; and an English machine translation thereof.

Ryuichi Ishino, Fujio Tsutsumi, Yoshiyuki Ueno, "Detection of Damaged Cables Using Aerial Video for Inspection of Transmission Lines," Transactions of the Institute of Electrical Engineers of Japan B, vol. 126, No. 4, pp. 407-414, Jul. 2006; and an English machine translation thereof.

Jrea, Oct. 1, 2019, vol. 62, No. 10, pp. 25-28, ISSN 0447-2322, in particular, p. 27 (Kudo, Yoshiyasu. Fundamental development of monitoring for signal bonds.); and an English machine translation of the abstract thereof.

English translation of the International Search Report dated Nov. 17, 2020, issued in counterpart International Application No. PCT/JP2020/036301.

Nikkei Business "Countermeasures for Big Data and Aging Electric Cables in loT" May 31, 2017; and an English machine translation thereof.

* cited by examiner

200

<u>360</u>

450

500

600

Start

S610

Generate gradient distribution

S620

Detect distribution peak in gradient distribution

S630

Generate feature value graph

S640

Determine presence or absence of abnormality based on distribution peak and abnormality threshold

S650

Output abnormality notification

End

FIG. 7
Gradient Distribution for each region
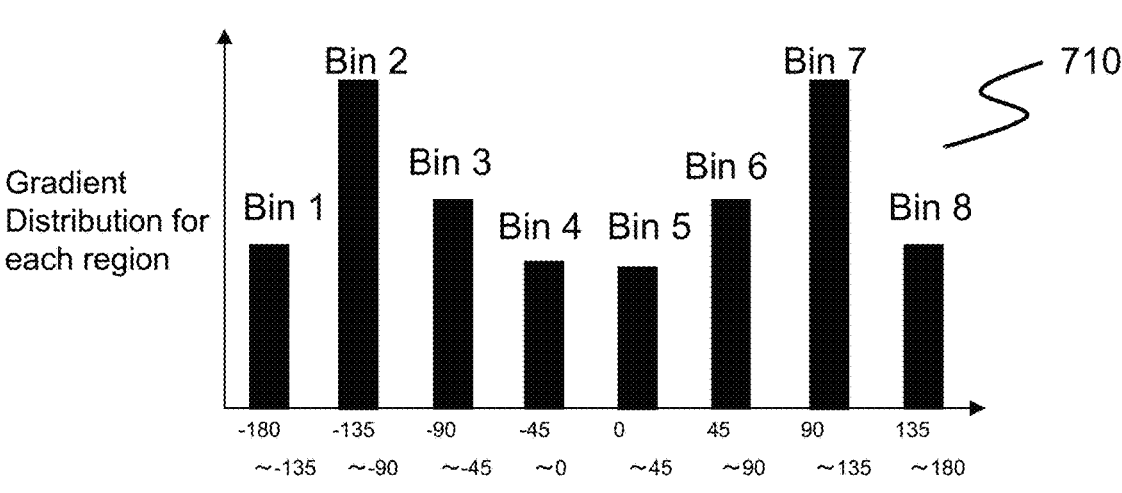
Arrange Gradient Distributions
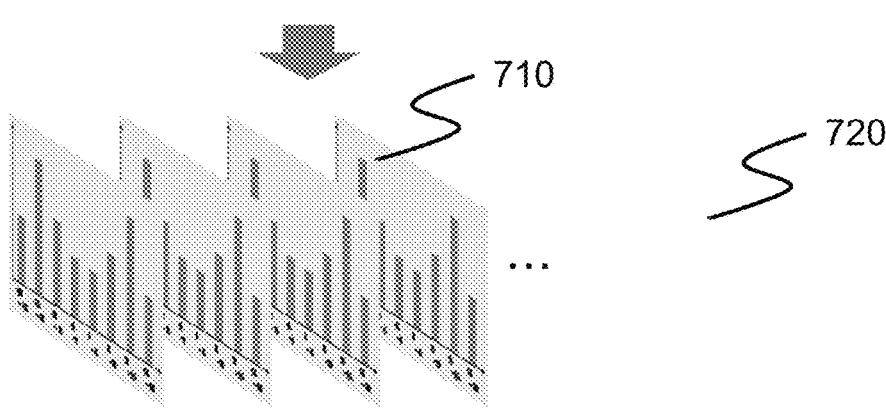
Heat Map Display
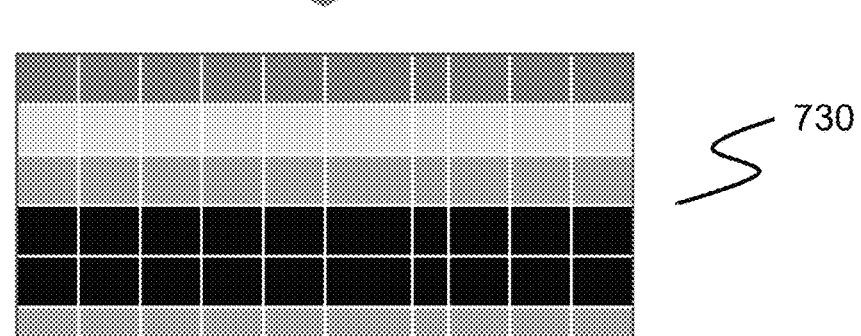

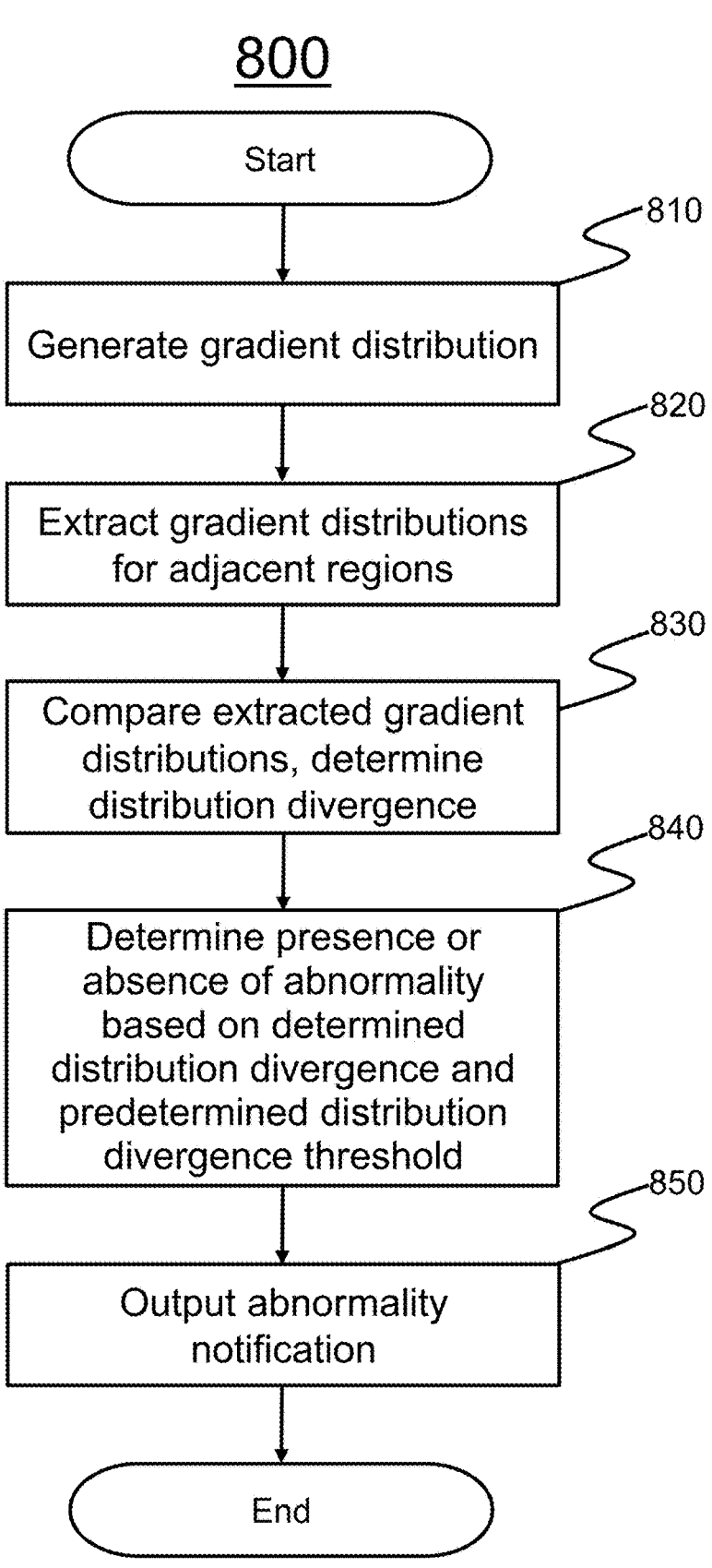

Start

Generate gradient distribution — 810

Extract gradient distributions for adjacent regions — 820

Compare extracted gradient distributions, determine distribution divergence — 830

Determine presence or absence of abnormality based on determined distribution divergence and predetermined distribution divergence threshold — 840

Output abnormality notification — 850

End

ABNORMALITY DETECTION DEVICE, ABNORMALITY DETECTION METHOD, AND ABNORMALITY DETECTION SYSTEM

TECHNICAL FIELD

The present disclosure relates to an abnormality detection device, an abnormality detection method, and an abnormality detection system.

BACKGROUND OF THE INVENTION

In recent years, with the progress of IT, a large number of sensors have been arranged throughout society, and extremely large amounts of data are accumulated.

Under such circumstances, various measures to utilize the accumulated image data have been considered. In particular, as image contents such as photographs, videos, and images increase, there is demand for a technique for accurately detecting whether or not an abnormality exists with respect to an object appearing in an image.

Conventionally, several proposals have been made for detecting the presence or absence of an abnormality with respect to an object appearing in an acquired image.

CITATION LIST

Non-Patent Documents

[Non-Patent Document 1]: "AI is the Key to Solving the Problem of How to Inspect Transmission Lines Spanning a Total Length of Approximately 14,000 km," Oct. 25, 2018

[Non-Patent Document 2]: Nikkei Business "Countermeasures for Big Data and Aging Electric Cables in IoT" May 31, 2017

[Non-Patent Document 3]: Ryuichi Ishino, Fujio Tsutsumi, Yoshiyuki Ueno, "Detection of Damaged Cables Using Aerial Video for Inspection of Transmission Lines," Transactions of the Institute of Electrical Engineers of Japan B, vol. 126, no. 4, pp. 407-414, July 2006.

SUMMARY OF INVENTION

Technical Problem

Non-Patent Document 1 describes a technique for assisting inspection operations of transmission lines by analyzing images acquired by an aerial vehicle such as a helicopter using AI and identifying damage or deterioration of the transmission lines.

Non-Patent Document 2 describes a technique for detecting abnormalities caused by lightning strikes or snow by using a robot that runs on top of the transmission lines to image capture the appearance of the transmission lines, and analyzing the captured images with a proprietary AI to determine portions that are not a straight line as "disconnections."

Non-Patent Literature 3 describes a method of using image analysis to detect an abnormality in a transmission line by analyzing the deviation from a change in an average luminance value or the color of a normal portion.

However, since both of the above-mentioned Non-Patent Documents 1 and 2 rely on AI-based image analysis, a large amount of learning data for training the AI is required in order to achieve good detection accuracy, and therefore, image capture and labeling by an expert worker become costly.

In addition, in the technique described in the above-mentioned Non-Patent Document 3, since the luminance value and color used as the basis of determination of the abnormality vary greatly depending on the weather, time, and surrounding environment, the detection accuracy is limited, and application to environments in which the luminance value and color are likely to vary is difficult.

Accordingly, it is an object of the present disclosure to provide a technique for detecting the presence or absence of an abnormality with respect to an object appearing in an analysis target image with high accuracy without using AI, even in an environment in which luminance values or colors are likely to fluctuate.

Means for Solving the Problems

In order to solve the above problem, one representative abnormality detection device of the present disclosure includes an image input unit for inputting an input image of an abnormality detection target object; a gradient distribution generation unit for dividing the input image into predetermined regions and generating, for each region, a gradient distribution that indicates a distribution of a luminance gradient-direction of the region; and an abnormality determination unit for determining a presence or absence of an abnormality by analyzing the gradient distribution generated for each region.

Advantageous Effects of Invention

According to the present disclosure, it is possible to provide a technique for detecting the presence or absence of an abnormality with respect to an object appearing in an analysis target image with high accuracy without using AI, even in an environment in which luminance values or colors are likely to fluctuate.

Problems, configurations, and effects other than those described above will be made clear by the following description of embodiments.

BRIEF DESCRIPTION OF DRAWINGS

FIG. 7 is a diagram illustrating an example of a gradient distribution according to the embodiments of the present disclosure.

FIG. 8 is a flowchart illustrating another example of the process which shows the flow of the second half of the abnormality detection method according to the embodiments of the present disclosure.

DESCRIPTION OF EMBODIMENT(S)

Figure 1:
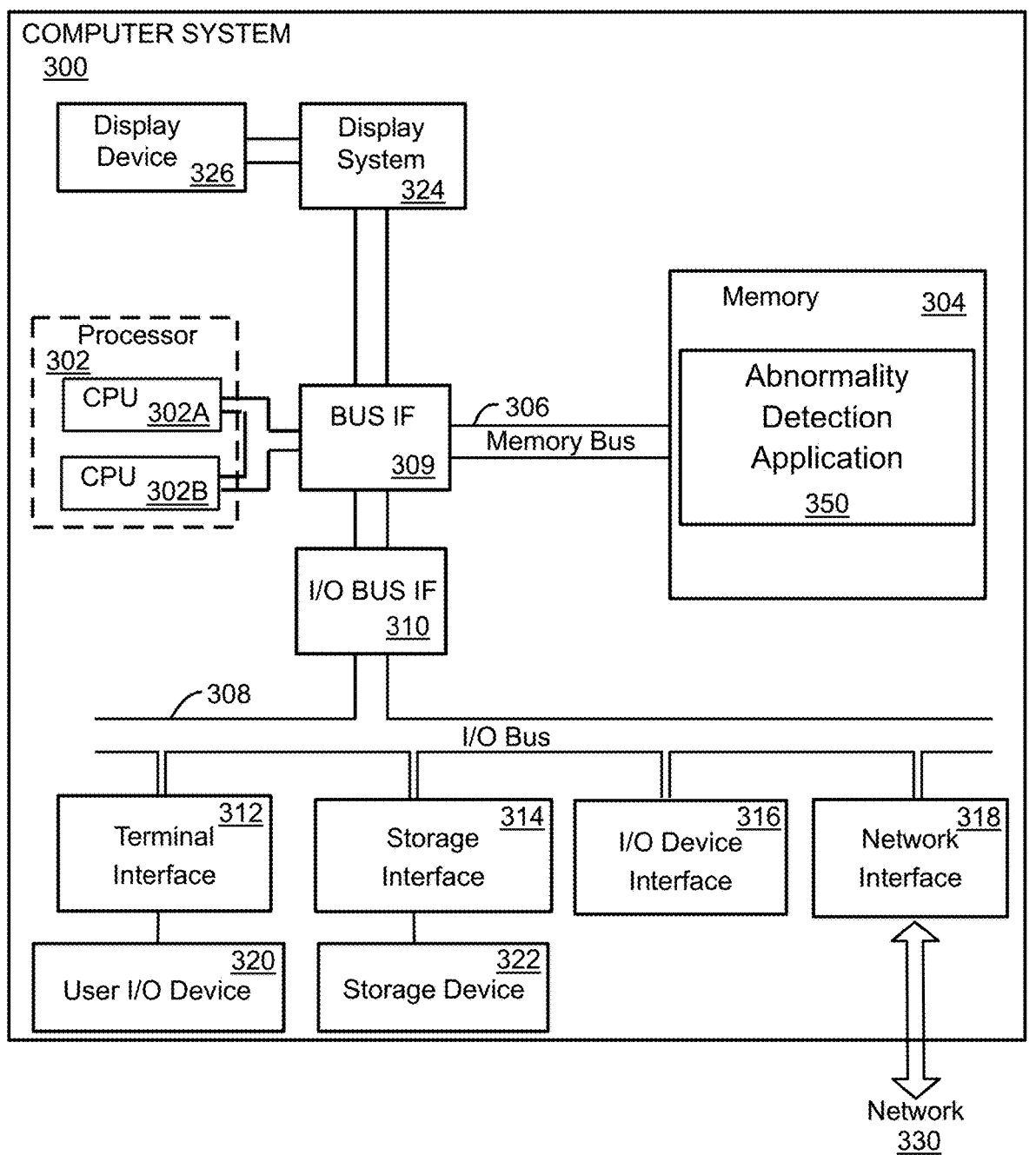
FIG. 1 is a block diagram of a computer system for implementing the embodiments of the present disclosure.

Hereinafter, a conventional example and the embodiments of the present disclosure will be described with reference to the drawings. It should be noted that the present disclosure is not limited to these embodiments. In addition, in the description of the drawings, the same components are denoted by the same reference numerals.

BACKGROUND AND SUMMARY OF THE PRESENT DISCLOSURE

As described above, as image content such as photographs, videos, and images increase, there is demand for techniques for accurately detecting whether or not an abnormality exists with respect to an object (hereinafter referred to as an "abnormality detection target object") appearing in an image.

Conventionally, in cases where visual inspection of substrates, devices, or the like are performed by image analysis at manufacturing sites or the like, inspection accuracy is improved by image capturing the inspection target with a fixed angle of view and fixed lighting.

However, in recent years, there has been increased demand for inspections in environments where a fixed angle of view and fixed lighting conditions are not guaranteed, such as at manufacturing sites. For example, the application of image processing is being considered for the visual inspection of infrastructure such as transmission lines, bridges, roads, and tunnels. Although the use of robots and drones for inspection is progressing, unlike visual inspections at factories, it is extremely difficult to maintain fixed image capture conditions such as angle of view and lighting.

On the other hand, although AI techniques such as machine-learning have been considered to reduce the effects of differences in image capture conditions, many AI techniques require high-performance computers, and in addition, it is necessary to collect large amounts of abnormal image data in addition to normal images.

Accordingly, in the present disclosure, abnormality determination is performed based on a luminance gradient of an input image indicating an abnormality detection target image. Since the gradient direction of the luminance does not change even if there is a change in brightness due to changes in the weather or the like, more robust abnormality detection than when using changes to luminance values or color as indices becomes possible, and there is no need to collect a large amount of learning data for training an AI. In this way, according to the present disclosure, it is possible to provide a technique for detecting the presence or absence of an abnormality with respect to an object appearing in an analysis target image with high accuracy without using AI, even in an environment in which luminance values or colors are likely to fluctuate.

Here, the abnormality detection target object refers to an object to be subjected to abnormality detection, and may be any object such as a silicon wafer used for manufacturing an electronic circuit, a power transmission line, an outer wall of a building, or the like, but as will be described later, is preferably an object with a periodic pattern.

In addition, the term abnormality here refers to a property that is different from the normal property of an abnormality detection target object that serves as the target object to be subjected to abnormality detection, and various abnormalities are conceivable depending on the type of the abnormality detection target object. For example, in the case that the abnormality detection target object is a power transmission line, damage to the power transmission line, melting due to lightning strikes, disconnections, deformation, and the like can be considered, and in the case that the abnormality detection target object is a substrate, cracking, chipping, warping, and the like can be considered.

(Hardware Configuration)

Referring first to FIG. 1, a computer system 300 for implementing the embodiments of the present disclosure will be described. The mechanisms and devices of the various embodiments disclosed herein may be applied to any suitable computing system. The main components of the computer system 300 include one or more processors 302, a memory 304, a terminal interface 312, a storage interface 314, an I/O (Input/Output) device interface 316, and a network interface 318. These components may be interconnected via a memory bus 306, an I/O bus 308, a bus interface unit 309, and an I/O bus interface unit 310.

The computer system 300 may include one or more general purpose programmable central processing units (CPUs), 302A and 302B, herein collectively referred to as the processor 302. In some embodiments, the computer system 300 may contain multiple processors, and in other embodiments, the computer system 300 may be a single CPU system. Each processor 302 executes instructions stored in the memory 304 and may include an on-board cache.

In some embodiments, the memory 304 may include random access semiconductor memory, storage device, or storage medium (either volatile or non-volatile) for storing data and programs. The memory 304 may store all or a part of the programs, modules, and data structures that perform the functions described herein. For example, the memory 304 may store an abnormality detection application 350. In some embodiments, the abnormality detection application 350 may include instructions or statements that execute the functions described below on the processor 302.

In some embodiments, the abnormality detection application 350 may be implemented in hardware via semiconductor devices, chips, logic gates, circuits, circuit cards, and/or other physical hardware devices in lieu of, or in addition to processor-based systems. In some embodiments, the abnormality detection application 350 may include data other than instructions or statements. In some embodiments, a camera, sensor, or other data input device (not shown) may be provided to communicate directly with the bus interface unit 309, the processor 302, or other hardware of the computer system 300.

The computer system 300 may include a bus interface unit 309 for communicating between the processor 302, the memory 304, a display system 324, and the I/O bus interface unit 310. The I/O bus interface unit 310 may be coupled with the I/O bus 308 for transferring data to and from the various I/O units. The I/O bus interface unit 310 may communicate with a plurality of I/O interface units 312, 314, 316, and 318, also known as I/O processors (IOPs) or I/O adapters (IOAs), via the I/O bus 308.

The display system 324 may include a display controller, a display memory, or both. The display controller may provide video, audio, or both types of data to the display device 326. Further, the computer system 300 may also include a device, such as one or more sensors, configured to collect data and provide the data to the processor 302.

For example, the computer system 300 may include biometric sensors that collect heart rate data, stress level data, and the like, environmental sensors that collect humidity data, temperature data, pressure data, and the like, and motion sensors that collect acceleration data, movement data, and the like. Other types of sensors may be used. The display system 324 may be connected to a display device 326, such as a single display screen, television, tablet, or portable device.

The I/O interface unit is capable of communicating with a variety of storage and I/O devices. For example, the terminal interface unit 312 supports the attachment of a user I/O device 320, which may include user output devices such as a video display device, a speaker, a television or the like, and user input devices such as a keyboard, mouse, keypad, touchpad, trackball, buttons, light pens, or other pointing devices or the like. A user may use the user interface to operate the user input device to input input data and instructions to the user I/O device 320 and the computer system 300 and receive output data from the computer system 300. The user interface may be presented via the user I/O device 320, such as displayed on a display device, played via a speaker, or printed via a printer.

The storage interface 314 supports the attachment of one or more disk drives or direct access storage devices 322 (which are typically magnetic disk drive storage devices, but may be arrays of disk drives or other storage devices configured to appear as a single disk drive). In some embodiments, the storage device 322 may be implemented as any secondary storage device. The contents of the memory 304 are stored in the storage device 322 and may be read from the storage device 322 as needed. The I/O device interface 316 may provide an interface to other I/O devices such as printers, fax machines, and the like. The network interface 318 may provide a communication path so that computer system 300 and other devices can communicate with each other. The communication path may be, for example, the network 330.

In some embodiments, the computer system 300 may be a multi-user mainframe computer system, a single user system, or a server computer or the like that has no direct user interface and receives requests from other computer systems (clients). In other embodiments, the computer system 300 may be a desktop computer, a portable computer, a notebook computer, a tablet computer, a pocket computer, a telephone, a smart phone, or any other suitable electronic device.

Next, with reference to FIG. 2, a configuration of an abnormality detection system according to the embodiments of the present disclosure will be described.

Figure 2:
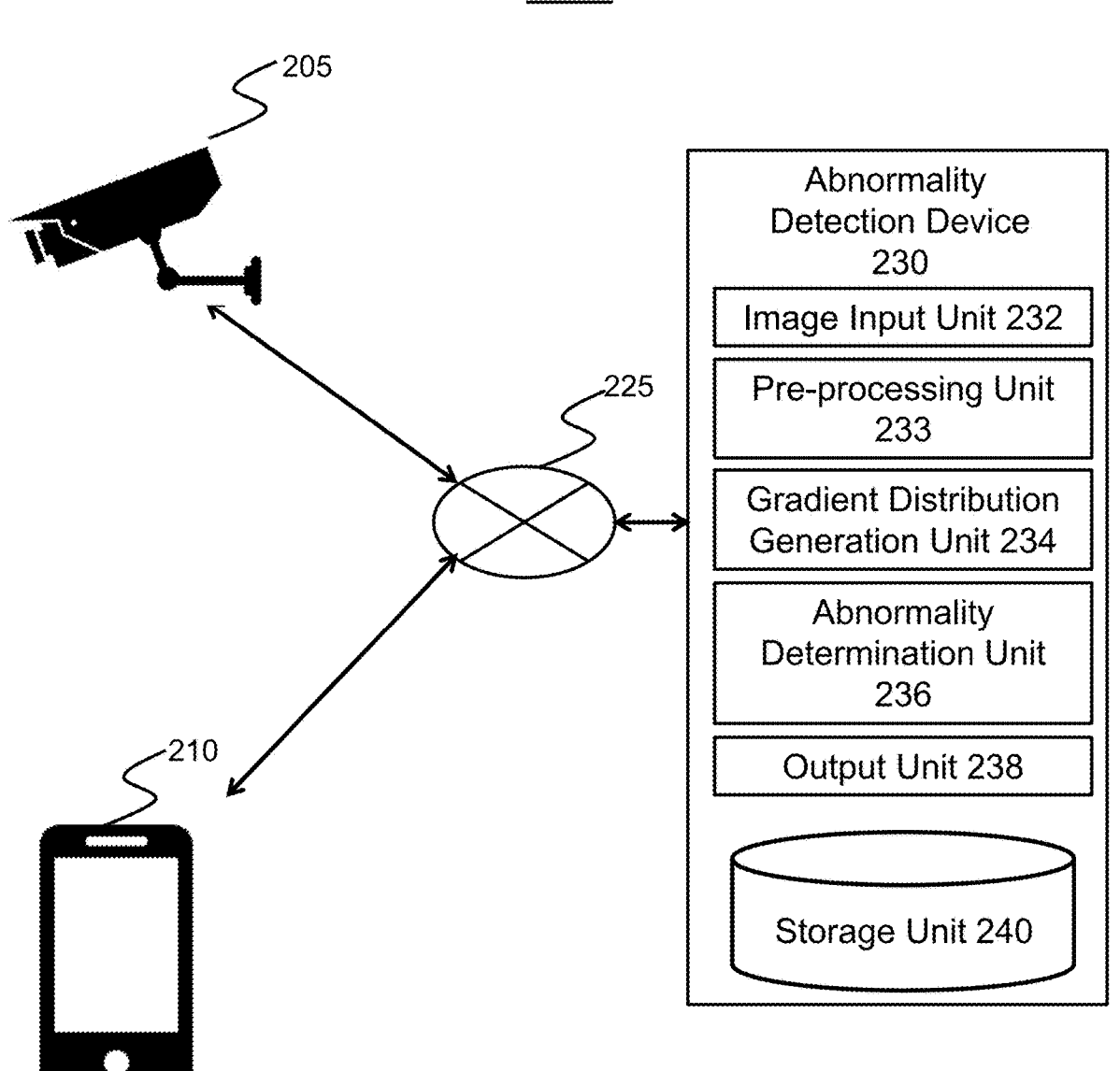
FIG. 2 is a diagram illustrating an example of a configuration of an abnormality detection system according to the embodiments of the present disclosure.

FIG. 2 is a diagram illustrating an example of the configuration of an abnormality detection system 200 according to the embodiments of the present disclosure. As illustrated in FIG. 2, the abnormality detection system 200 includes a sensor device 205, a client terminal 210, and an abnormality detection device 230. In addition, the sensor device 205, the client terminal 210, and the abnormality detection device 230 are connected to each other via a communication network 225.

The communication network 225 may be, for example, the Internet or a Local Area Network (LAN).

The sensor device 205 is a sensor for acquiring an image that indicates the appearance of an abnormality detection target object that serves as the target object to be subjected to abnormality detection. The image (hereinafter, the "input image" input to the abnormality detection device) acquired by the sensor device 205 may be directly transmitted to the abnormality detection device 230 or may be transmitted to the client terminal 210.

The number, type, and arrangement of the sensor devices 205 may be appropriately selected depending on the abnormality detection target object. For example, in the case that the abnormality detection target object is a power transmission line, the sensor device 205 may be a camera mounted on a self-propelled robot that moves along the power transmission line, and in the case that the abnormality detection target object is a silicon wafer used for manufacturing an electronic circuit, the sensor device 205 may be a camera mounted on a device that processes the silicon wafer.

In addition, the sensor device 205 may acquire object identification information for identifying the abnormality detection target object in addition to the image indicating the appearance of the abnormality detection target object. Thus, for example, in the case that an abnormality is detected with respect to the abnormality detection target object, a user such as an operator who confirms the detected abnormality can easily identify the abnormality detection target object.

The client terminal 210 is a device for requesting the abnormality detection device 230 to perform abnormality detection processing with respect to the abnormality detection target and confirming an abnormality notification output by the abnormality detection system 200. The client terminal 210 may be, for example, a portable terminal such as a smartphone or a tablet, or a fixed terminal such as a desktop personal computer. In embodiments, the client terminal 210 may be a terminal used by a user, such as an on-site worker who confirms an abnormality detected with respect to the abnormality detection target object.

As an example, the client terminal 210 may, after receiving images acquired by the sensor device 205, select, from the received images, an image that clearly indicates the appearance of the abnormality detection target object that serves as the target object to be subjected to abnormality detection, and transmit the selected image and an abnormality detection request for requesting abnormality detection processing with respect to the abnormality detection target object to the abnormality detection device 230 via the communication network 225. Subsequently, as a result of the determination by the abnormality detection device 230, in the case that an abnormality is determined with respect to the abnormality detection target object, a user such as an on-site worker may use the client terminal 210 to confirm the abnormality notification transmitted from the abnormality detection device 230 and perform inspection, maintenance, or the like with respect to the abnormality detection target object.

The abnormality detection device 230 is a device for performing an abnormality detection process according to the embodiments of the present disclosure on an input image received from the sensor device 205 or the client terminal 210 and detecting the presence or absence of an abnormality. As illustrated in FIG. 2, the abnormality detection device 230 includes an image input unit 232, a pre-processing unit 233, a gradient distribution generation unit 234, an abnormality determination unit 236, an output unit 238, and a storage unit 240.

The image input unit 232 is a functional unit for inputting an input image indicating an abnormality detection target object. For example, the image input unit 232 may receive, from the sensor device 205 or the client terminal 210, an input image indicating the appearance of an abnormality detection target object that serves as the target object to be subjected to abnormality detection via the communication network 225 and input the input image.

The pre-processing unit 233 is a functional unit for performing pre-processing (area extraction and gray scale conversion) with respect to the input image received by the image input unit 232 in order to facilitate the abnormality detection processing according to the embodiments of the present disclosure.

The details of the pre-processing performed by the pre-processing unit 233 will be described later with reference to FIG. 5.

The gradient distribution generation unit 234 is a functional unit that divides an input image into regions of a predetermined size and generates, for each region, a gradient distribution that indicates the distribution of a luminance gradient direction of the region. It should be noted that, in the present disclosure, the gradient distribution represents a distribution in the gradient direction of the luminance, and includes various forms of expression such as maps and diagrams. As will be described later, by using the gradient distribution generated here, it is possible to detect the presence or absence of an abnormality with respect to an object appearing in a target with high accuracy without using AI, even in an environment in which luminance values and colors easily fluctuate.

The abnormality determination unit 236 is a functional unit for determining the presence or absence of an abnormality by analyzing the gradient distribution generated for each region.

Here, for example, the abnormality determination unit 236 may detect, from among each of the gradient distributions generated for each of the regions, a gradient direction that satisfies a predetermined frequency criterion as a distribution peak, and determine the presence or absence of an abnormality based on the detected distribution peak and a predetermined abnormality threshold set in advance.

In addition, in an embodiment, the abnormality determination unit may generate an average gradient distribution by averaging each gradient distribution generated for each of the regions, detect, in the average gradient distribution, a gradient direction that satisfies a predetermined frequency criterion as a distribution peak, and determine the presence or absence of an abnormality based on the detected distribution peak and a predetermined abnormality threshold set in advance.

Further, in an embodiment, the abnormality determination unit may extract, from among each of the gradient distributions generated for each of the regions, a first gradient distribution corresponding to a first region and a second gradient distribution corresponding to a second region adjacent to the first region, determine a distribution divergence between the first gradient distribution and the second gradient distribution by comparing the first gradient distribution and the second gradient distribution, and determine the presence or absence of an abnormality based on the determined distribution divergence and a predetermined distribution divergence threshold set in advance.

It should be noted that the details of the processing of the abnormality determination unit 236 will be described later.

The output unit 238 is a functional unit for outputting a result of the abnormality determination by the abnormality determination unit. For example, the output unit 238 may output, in a case that an abnormality is determined by the determination of the presence or absence of an abnormality by the abnormality determination unit, an abnormality notification that includes an image indicating the region determined to be abnormal. The abnormality notification output here may be transmitted to the client terminal 210 via the communication network 225. As described above, a user, such as an on-site worker, may use the client terminal 210 to confirm the abnormality notification transmitted from the abnormality detection device 230 and perform inspection, maintenance, or the like with respect to the abnormality detection target object.

The storage unit 240 is a storage device for storing the various types of information used by the abnormality detection device 230. The storage unit 240 may store, for example, information of input images received from the sensor device 205 or the client terminal 210, information of abnormality notifications, and the like.

The storage unit 240 may be, for example, a storage device such as a hard disk drive or a solid state drive mounted in the abnormality detection device 230, or may be a cloud-type storage area accessible from the abnormality detection device 230.

According to the abnormality detection system 200 configured as described above, it is possible to provide a technique for detecting the presence or absence of an abnormality with respect to an object appearing in an analysis target image with high accuracy without using AI, even in an environment in which luminance values or colors are likely to fluctuate.

Next, with reference to FIG. 3 to FIG. 4, the luminance gradient used in the abnormality detection technique according to the embodiments of the present disclosure will be described.

Figure 3:
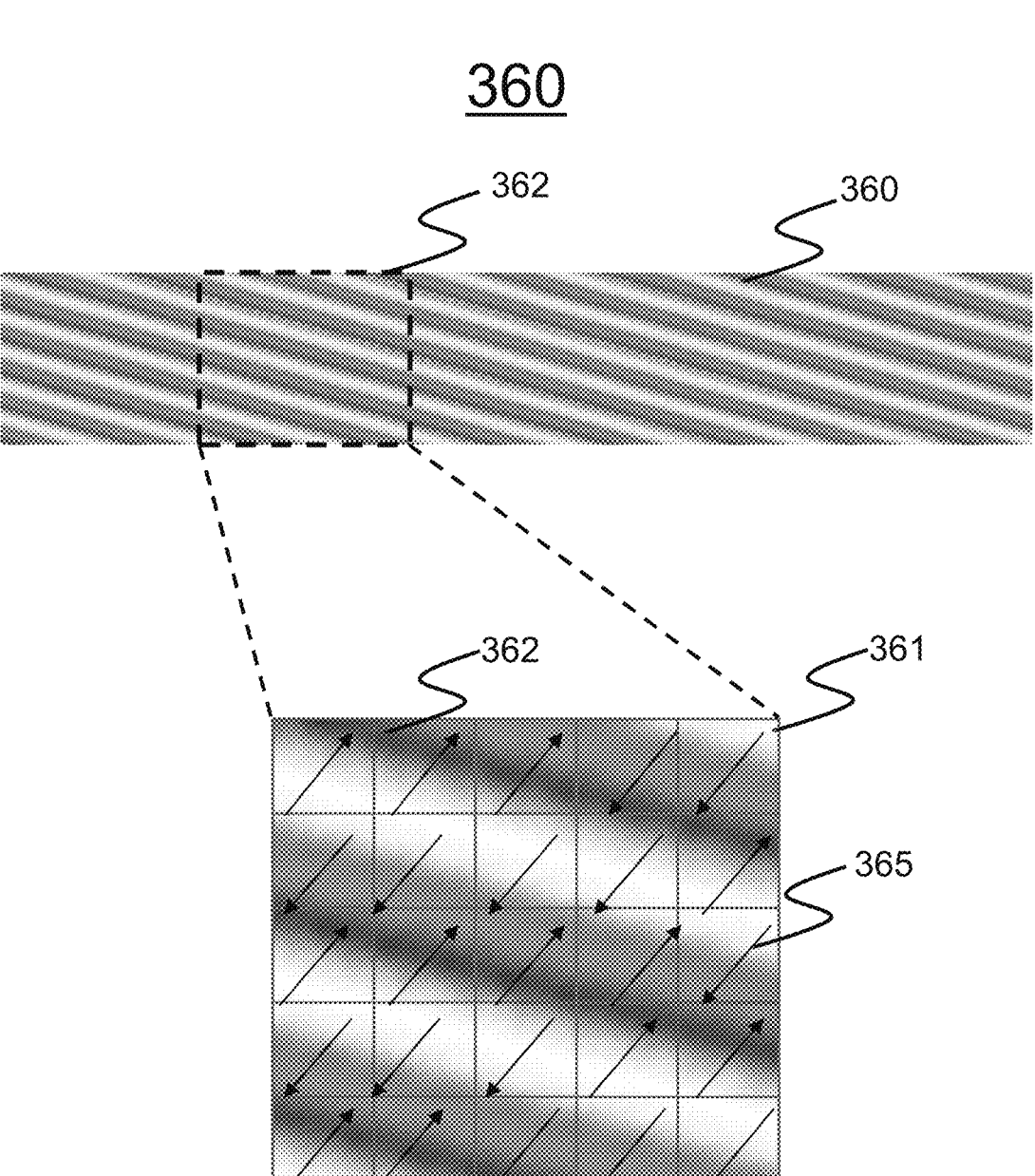
FIG. 3 is a diagram illustrating an input image showing an abnormality detection target object and a luminance gradient in the input image according to the embodiments of the present disclosure.

FIG. 3 is a diagram illustrating an input image 360 showing an abnormality detection target object and a luminance gradient direction 365 in the input image 360, according to the embodiments of the present disclosure. In addition, the enlarged view 361 illustrated in FIG. 3 is an enlarged view of the predetermined region 362 in the input image 360.

The input image 360 is, for example, an image that was image captured by the sensor device 205 described with reference to FIG. 2 and that illustrates the appearance of a power transmission line. In addition, as will be described later, the input image 360 illustrated in FIG. 3 is an image that has already been subjected to pre-processing (area extraction, grayscale conversion, contrast correction, and area division) to facilitate the abnormality detection technique according to the embodiments of the present disclosure.

Each pixel in the input image 360 has a luminance value of 0 to 255 as a value representing the luminance (brightness) of that pixel. A pixel closer to black has a lower luminance value, and a pixel closer to white has a higher luminance value (0=black, 255=white). In the present disclosure, the direction extending from higher luminance values to lower luminance values is referred to as a "gradient of the luminance" or a "luminance gradient." In the enlarged view 361, the luminance gradient direction 365 of the block is illustrated for each of a plurality of blocks constituting the predetermined region 362 in the input image 360.

It should be noted that, in the present disclosure, it is assumed that a uniform, periodic pattern exists in the appearance of the abnormality detection target object, and the regions 362 here are regions having a size in which at least one period of the pattern is contained.

Figure 4:
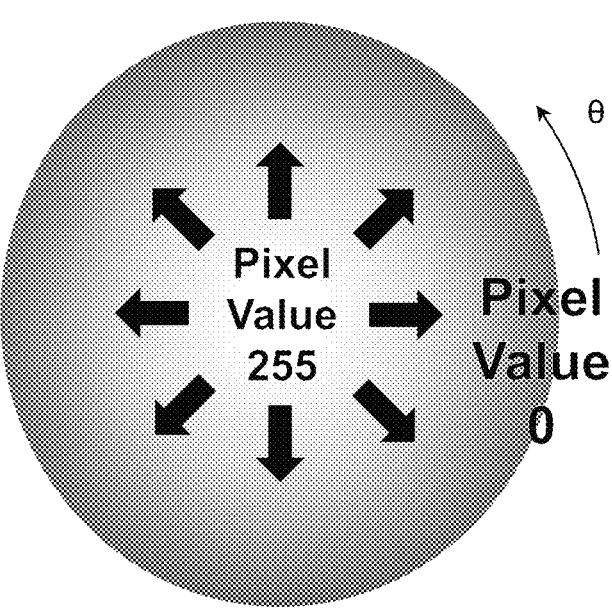
FIG. 4 is a diagram illustrating an example of the notation of a luminance gradient according to the embodiments of the present disclosure.

As shown in the notation reference 450 in FIG. 4, in the present disclosure, the gradient of the luminance is set such that the horizontal axis direction of the input image is 0 degrees, the counterclockwise direction represents positive values, and the clockwise direction represents negative values. According to this notation reference, the angle of the luminance gradient for each of a plurality of blocks constituting a specific region in an arbitrary input image can be represented using a consistent notation.

As described above, in the abnormality detection technique according to the embodiments of the present disclosure, the abnormality in the abnormality detection target object is determined based on the gradient of the luminance of an input image indicating the abnormality detection target object. By analyzing the distribution of the gradient of the luminance in an input image indicating the abnormality detection target object, it is possible to ascertain whether an abnormality appears in the appearance of the abnormality detection target object. For example, in a case where the distribution of the luminance gradient for each of a plurality of blocks constituting a specific region in the input image is dispersed over various angles, or in a case where the distribution between adjacent regions diverges greatly, it is determined that an abnormality such as damage or deterioration exists in the appearance of the abnormality detection target object.

Since the direction of the gradient of the luminance does not change even if there is a change in brightness in the image capture environment due to, for example, changes in weather or the like, more robust abnormality detection than when using changes to luminance values or color as indices becomes possible, and there is no need to collect a large amount of learning data for training an AI. In this way, according to the present disclosure, it is possible to provide a technique for detecting the presence or absence of an abnormality with respect to an object appearing in an analysis target image with high accuracy without using AI, even in an environment in which luminance values or colors are likely to fluctuate.

Next, with reference to FIG. 5, a description will be given of a process which shows the flow of the first half of the abnormality detection method according to the embodiments of the present disclosure.

Figure 5:
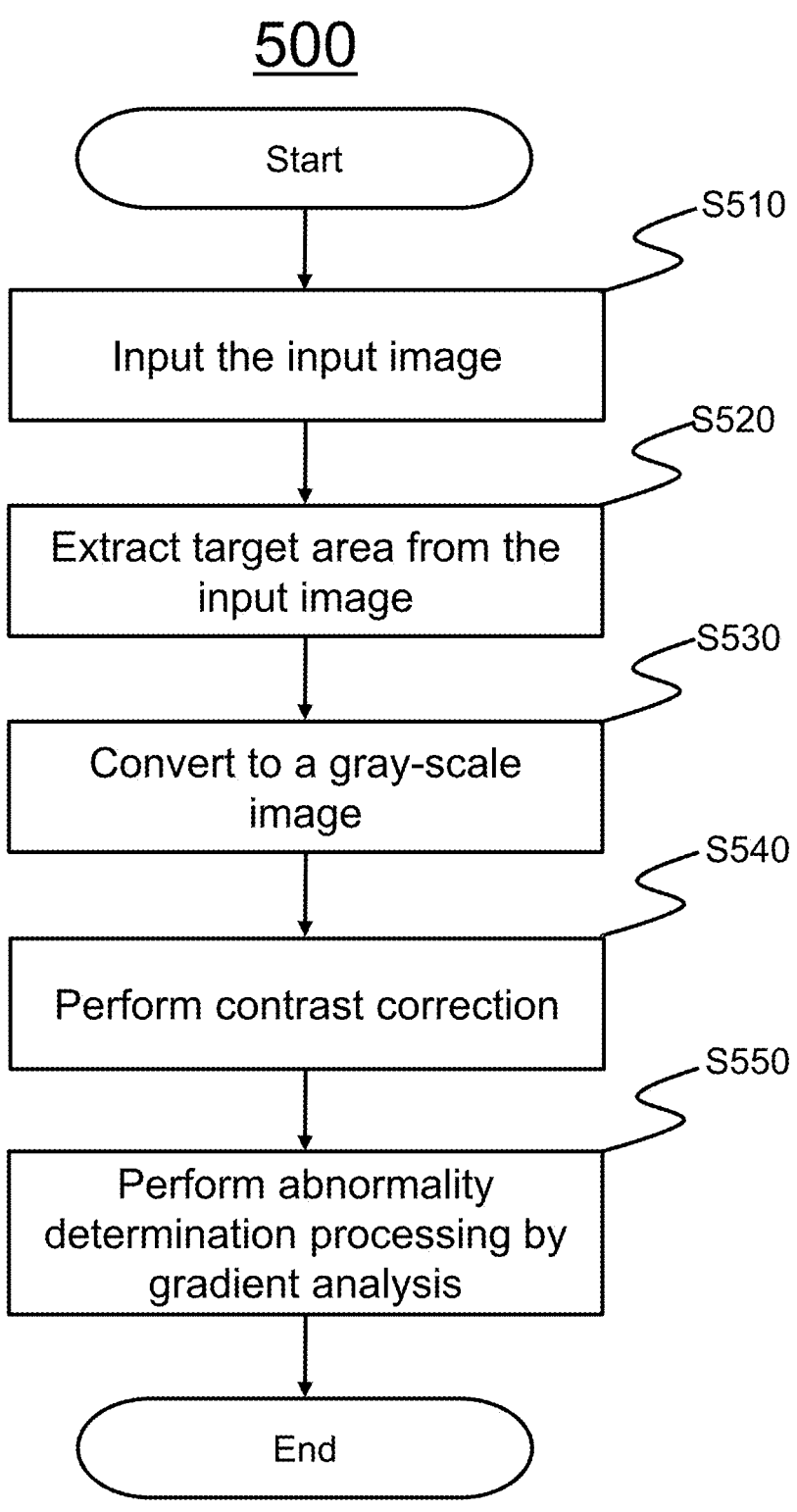
FIG. 5 is a flowchart illustrating an example of the process which shows the flow of the first half of the abnormality detection method according to the embodiments of the present disclosure.

FIG. 5 is a flowchart illustrating an example of a process 500 which shows the flow of the first half of the abnormality detection method according to the embodiments of the present disclosure. The process 500 illustrated in FIG. 5 is, for example, a process performed by the image input unit 232, the pre-processing unit 233, and the gradient distribution generation unit 234 in the abnormality detection device 230 illustrated in FIG. 2.

First, in Step S510, the image input unit (for example, the image input unit 232 illustrated in FIG. 2) inputs an input image. As described above, in this case, the image input unit may receive, from the sensor device or the client via the communication network, an input image that indicates the appearance of an abnormality detection target object that serves as the target object to be subjected to abnormality detection and input the received image. The input image here may be, for example, a RGB image.

Next, in Step S520, the pre-processing unit (for example, the pre-processing unit 233 illustrated in FIG. 2) may extract, from the input image received in Step S510, an area indicating the appearance of the abnormality detection target image. Here, for example, in the case that the angle of view of a sensor device such as a camera is fixed, the pre-processing unit may extract an area indicating the appearance of the abnormality detection target object based on a preset set in advance with respect to the sensor device such as the camera. In addition, the pre-processing unit may extract an area using an existing background removal technique, a segmentation unit, or an object recognition unit.

Next, in Step S530, the pre-processing unit performs grayscale conversion on the area of the input image extracted in Step S520. Here, the pre-processing unit may use any existing technique, and is not particularly limited in the present disclosure.

It should be noted that, although a case in which a color image is converted into gray scale is described as an example in the present disclosure, the present disclosure is not limited to this, and in a case in which there are features in the color information, the gradient analysis to be described later can be performed on each color channel of an RGB image.

Next, in Step S540, the pre-processing unit performs contrast-correction on the image subjected to the grayscale conversion in Step S530. This contrast correction is a process performed to enhance the visibility of the image by enhancing the brightness and darkness of the image and making the shading clearer, and is not essential in the gradient analysis described later. Accordingly, Step S540 here may be skipped in cases where computing resources are limited, for example. However, it is desirable to perform contrast correction because it makes it easier to visually confirm the results of the abnormality determination.

Next, in Step S550, the gradient distribution generation unit (for example, the gradient distribution generation unit 234 illustrated in FIG. 2) analyzes the gradient. The gradient analysis may be performed by conventional methods such as Sobel filters, for example, and is an analysis for expressing the size relation of pixel values between neighboring pixels.

According to the process 500 described above, since the luminance gradient analysis processing is performed on an image subjected to the pre-processing such as area extraction and grayscale conversion, a high-quality abnormality determination result can be obtained.

Next, with reference to FIG. 6 and FIG. 7, a description will be given of a process which shows the flow of the second half of the abnormality detection method according to the embodiments of the present disclosure.

Figure 6:
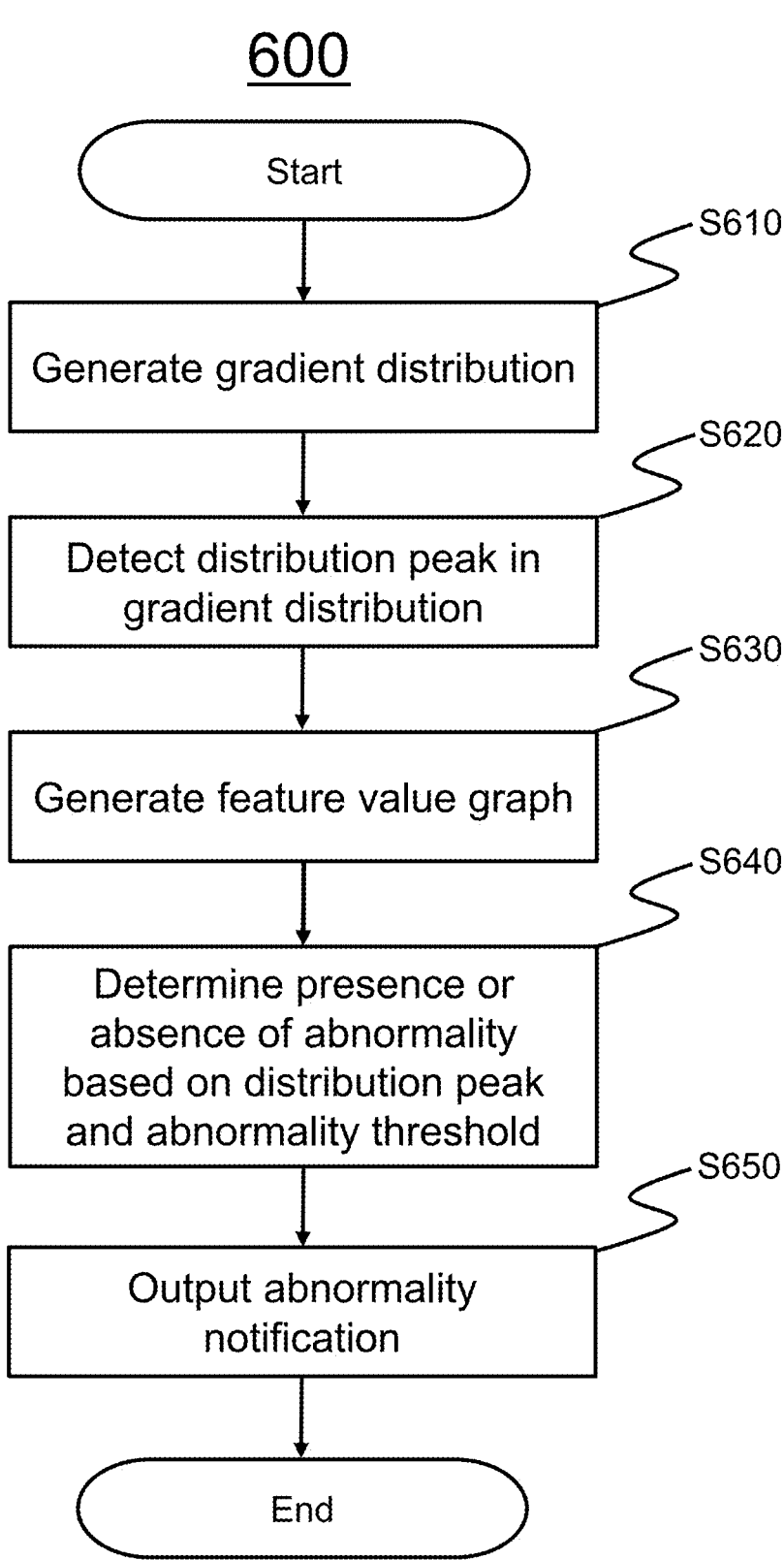
FIG. 6 is a flowchart illustrating an example of the process which shows the flow of the second half of the abnormality detection method according to the embodiments of the present disclosure.

FIG. 6 is a flowchart illustrating an example of a process 600 which shows the flow of the second half of the abnormality detection method according to the embodiments of the present disclosure. The process 600 illustrated in FIG. 6 is a process of determining the presence or absence of an abnormality based on the distribution peak of the luminance gradient of the input image indicating the abnormality detection target object, and is, for example, a process performed following Step S550 of the process 500 in the first half of the abnormality detection process illustrated in FIG. 5. In addition, FIG. 7 is a diagram illustrating an example of a gradient distribution according to the embodiments of the present disclosure.

It should be noted that the process 600 illustrated in FIG. 6 is, for example, a process performed by the gradient distribution generation unit 234, the abnormality determination unit 236, and the output unit 238 of the abnormality detection device 230 illustrated in FIG. 2.

First, in Step S610, the gradient distribution generation unit divides the input image into a plurality of regions, and generates, for each region, a gradient distribution that indicates the distribution of the luminance gradient direction of the region. Here, the gradient distribution is a data structure that indicates the frequency (number of times) distribution at which a predetermined gradient angle appears in a particular region, and may be represented as a histogram such as the gradient distribution 710 shown in FIG. 7 that shows the frequency per bin corresponding to different gradient angles in the range of −180 degrees to 180 degrees. In this way, a number of histograms equal to the number of regions can be acquired, such as the set of gradient distributions 720 shown in FIG. 7.

As an example, as illustrated in Equations 1 and 2 below, an input image is divided into N regions, and for each region $$n$$                                                         [Equation 1]

a histogram $$h_n=[h_{n1},h_{n2}, \ldots ,h_{nB}]^T$$                     [Equation 2]

indicating the distribution of the luminance gradient direction of the region may be generated.

Here, T means transpose and B is the number of bins in the histogram.

In addition, here, the size of the region must be such as to include one or more periods of the design of the abnormality detection target object within the region. By including several periods within the region, the characteristics of the normal state of the abnormality detection target can be represented by the gradient distribution.

It should be noted that if the size of the region is too large, it becomes difficult to detect abnormalities in the case that there are small abnormalities, and abnormality detection becomes difficult. In addition, in the case that the gradient distribution is represented as a histogram, the width of the bins of the histogram can be arbitrarily set, but if the width of the bins is too small, susceptibility to distortions of the sensor devices such as cameras, lighting conditions, and the tolerance of the abnormality detection target object increases, and the characteristics of the normal state become less apparent. On the other hand, if the width of the bin is too large, the difference between the normal and abnormal features becomes ambiguous. In view of the above, it is important to appropriately set the size of the region and the width of the bin in order to obtain a high quality abnormality determination result.

Next, in Step S620, the abnormality determination unit detects the distribution peak in the gradient distribution. Here, the distribution peak refers to a gradient angle having the highest frequency in the gradient distribution, and is a feature for determining whether or not an abnormality exists in the abnormality detection target.

The distribution peak in the gradient distribution can be obtained by various methods, and is not particularly limited here. As an example, a gradient angle that satisfies a predetermined frequency criterion may be identified as the distribution peak from among the respective gradient distributions generated for each region. The predetermined frequency criterion may be a predetermined frequency set arbitrarily, or may be a criterion for specifying the gradient angle that has the highest frequency or the like (that is, to find the gradient direction that is the peak of the histogram for each region, and take the one with the highest frequency (number of occurrences) among the peak gradient directions as the peak).

As another example of detecting the distribution peak in the gradient distribution, an average gradient distribution may be generated by averaging the respective gradient distributions generated for each region, and a gradient that satisfies a predetermined frequency criterion may be detected as the distribution peak in the average gradient distribution.

For example, when the gradient distribution is expressed as a histogram, as shown in the following Equations 3-6, an average histogram $$\bar{h}=[\bar{h}_1, \ldots ,\bar{h}_b \ldots \bar{h}_B]^T$$     [Equation 3]

obtained by averaging the histograms of each region may be used to detect the bin $$b$$                                                         [Equation 4]

that corresponds to the peak.

$$\bar{h} = \frac{1}{N}\sum_{n=1}^{N} h_n$$                   [Equation 5]

$$b = \arg\max_i(\bar{h})$$                                  [Equation 6]

Next, in Step S630, the abnormality determination unit calculates an abnormality degree of each region based on the values corresponding to the gradients of the peaks detected in Step S620. Here, the abnormality degree of each region is a value indicating a divergence degree (distribution divergence degree) of the gradient distribution of a specific region from the normal distribution. As a method of calculating the abnormality degree, for example, a feature value graph g obtained by the following Equations 7 and 8 may be used.

$$g=\max(f_{max})-f_{max}$$                                  [Equation 7]

$$f_{max}=[h_{b1},h_{b2}, \ldots ,h_{bN}]^T$$                 [Equation 8]

Next, in Step S640, the abnormality determination unit determines the presence or absence of an abnormality with respect to each region of the input image based on the abnormality degree calculated based on the distribution peak in Step S630 and a predetermined abnormality threshold set in advance. Here, the abnormality threshold value is a value defining the boundary line between normal and abnormal, and may be set by a user, or may be automatically determined by the abnormality determination unit based on previous abnormality determination data. As an example, in the case that the abnormality degree calculated for a specific region is a value equal to or greater than the predetermined abnormality threshold value set in advance (that is, when the value of the feature value graph g is equal to or greater than the abnormality threshold value), the abnormality determination unit determines that an abnormality exists with respect to this region, and in the case that the abnormality degree calculated for the specific region is a value less than the predetermined abnormality threshold value set in advance, the abnormality determination unit determines that an abnormality does not exist in the region.

Next, in Step S650, the output unit (for example, the output unit 238 illustrated in FIG. 2) outputs an abnormality notification indicating the result of the abnormality determination in Step S640. Here, the abnormality notification may be an image indicating the abnormality degree calculated for each region in the input image. In an embodiment, the abnormality notification may include an image that indicates the regions determined to be abnormal. In addition, in some embodiments, the abnormality notification may include a heat map 730 that aggregates the set of gradient distributions 720 illustrated in FIG. 7. In the heat map 730, the abnormality degree of each region in the input image is indicated by a color gradation.

In addition, as described above, the abnormality notification generated in Step S650 may be transmitted to the client terminal via the communication network.

According to the process 600 described above, it is possible to detect the presence or absence of an abnormality with respect to the abnormality detection target object with high accuracy based on the distribution peak of the luminance gradient of an input image indicating the abnormality detection target object.

Figure 9:
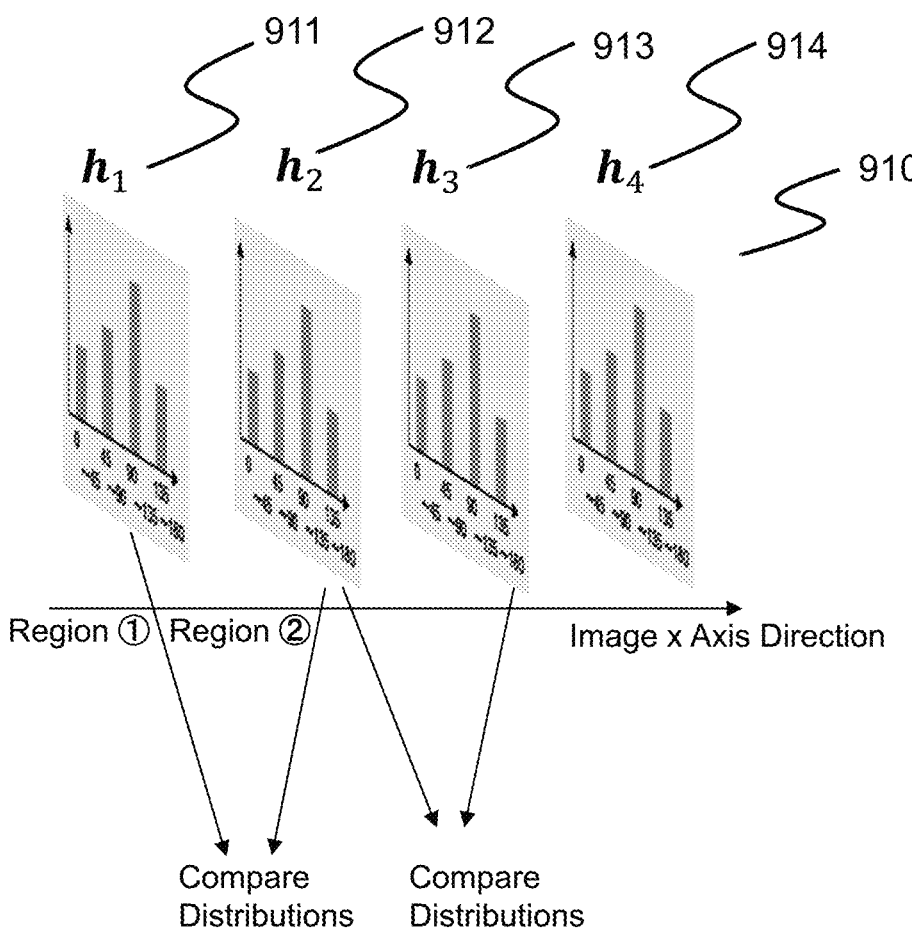
FIG. 9 is a diagram illustrating a concept of the processing illustrated in FIG. 8.

Next, with reference to FIG. 8 and FIG. 9, another example of the abnormality determination process according to the embodiments of the present disclosure will be described.

FIG. 8 is a flowchart illustrating an example of a process 800 which shows the flow in the second half of the abnormality detection method according to the embodiments of the present disclosure. The process 800 illustrated in FIG. 8 is a process for detecting an abnormality using a method different from that of the process 600 illustrated in FIG. 6, and is a process performed following Step S550 in the process 500 illustrated in FIG. 5, for example, similarly to the process 600 illustrated in FIG. 6. FIG. 9 is a diagram illustrating a concept of the process 800 illustrated in FIG. 8.

More particularly, the process 800 illustrated in FIG. 8 is a process of determining the presence or absence of an abnormality by comparing gradient distributions between adjacent regions in an input image that indicates an abnormality detection target object, and is performed by, for example, the gradient distribution generation unit 234, the abnormality determination unit 236, and the output unit 238 illustrated in FIG. 2.

First, in Step S810, the gradient distribution generation unit divides the input image into a plurality of regions, and generates, for each region, a gradient distribution that indicates the distribution of the luminance gradient direction of the region. As described herein, here, the gradient distribution is a data structure that indicates the frequency (number of times) distribution at which a predetermined gradient angle appears in a particular region, and may be represented as a histogram such as the gradient distribution 710 shown in FIG. 7 that shows the frequency per bin corresponding to different gradient angles in the range of −180 degrees to 180 degrees. In this way, a number of histograms equal to the number of regions can be acquired, such as the set of gradient distributions 720 shown in FIG. 7.

It should be noted that as Step S810 in the process 800 is substantially the same as Step S610 in the process 600 described with reference to FIG. 6, the description thereof is omitted here.

Next, in Step S820, the abnormality determination unit extracts a gradient distribution corresponding to adjacent regions (hereinafter referred to as "adjacent regions") from among the respective gradient distributions generated for each region. For example, the abnormality determination unit may extract a first gradient distribution corresponding to a first region and a second gradient distribution corresponding to a second region adjacent to the first region.

Next, in Step S830, the abnormality determination unit compares the gradient distributions of the adjacent regions extracted in Step S830, and determines the distribution divergence degree of these gradient distributions. Here, the distribution divergence degree here is a value that indicates the distance of the gradient distributions, such that a larger distribution divergence degree of the gradient direction distribution indicates a larger difference from the gradient direction distribution of other regions. For example, as illustrated in FIG. 9, from among the set of gradient distributions 910, the gradient distribution 911 and the gradient distribution 912 are compared, and the gradient distribution 913 and the gradient distribution 914 are compared.

Hereinafter, a case will be considered in which the gradient direction distributions (histogram or the like)

$$h_n \qquad \text{[Equation 9]}$$

and $$h_{n+1} \qquad \text{[Equation 10]}$$

between adjacent regions are compared with each other, and the distribution divergence degree is calculated.

First, as illustrated in the following Equations 11-12, the gradient direction distribution (a histogram or the like)

$$h_n \qquad \text{[Equation 11]}$$

can be represented as a probability distribution $$P_n = h_n/(WH) \qquad \text{[Equation 12]}$$

Here, $$W \qquad \text{[Equation 13]}$$

represents the width of the region (in terms of the number of pixels or the number of blocks), and $$H \qquad \text{[Equation 14]}$$

represents the height of the area (in terms of the number of pixels or the number of blocks).

Then, the Kullback-Leibler divergence (KL Divergence) D can be obtained by Equation 15 as the distribution divergence degree.

$$D = \sum P_n \log \frac{P_n}{P_{n+1}} \qquad \text{[Equation 15]}$$

It should be noted that here, the use of adjacent regions as the subjects of comparison is because there is a high possibility that distortions of the camera, lighting conditions, and the like are the same in adjacent regions, and any combination of regions may be used as long as it is a comparison between regions in which the appearance patterns are estimated to be the same in normal conditions.

Next, in Step S840, the abnormality determination unit determines the presence or absence of an abnormality with respect to each region of the input image based on the distribution divergence degree determined in Step S830 and a predetermined distribution divergence threshold set in advance. Here, the distribution divergence threshold value is a value defining the boundary line between a normal distribution divergence degree and an abnormal distribution divergence degree, and may be set by a user, or may be automatically determined by the abnormality determination unit based on previous abnormality determination data. As an example, in the case that the distribution divergence degree calculated for specific adjacent regions is a value equal to or greater than the predetermined distribution divergence threshold value set in advance, the abnormality determination unit determines that an abnormality exists with respect to these adjacent regions, and in the case that the distribution divergence degree calculated for the specific adjacent regions is a value less than the predetermined distribution divergence threshold value set in advance, the abnormality determination unit determines that an abnormality does not exist in the adjacent regions.

Next, in Step S850, the output unit (for example, the output unit 238 illustrated in FIG. 2) outputs an abnormality notification indicating the results of the abnormality determination in Step S840.

It should be noted that Step S850 in the process 800 is substantially the same as Step S650 in the process 600 described with reference to FIG. 6, and therefore the explanation thereof is omitted here.

According to the process 800 described above, it is possible to detect the presence or absence of an abnormality in the abnormality detection target object with high accuracy based on the distribution peak of the luminance gradient of an input image indicating the abnormality detection target object.

Although the embodiments of the present disclosure have been described above, the present disclosure is not limited to the above-described embodiments, and various modifications can be made without departing from the spirit of the present disclosure.

REFERENCE SIGNS LIST

200: Abnormality detection system, 205: Sensor device, 210: Client terminal, 225: Communication network, 230: Abnormality detection device, 232: Image input unit, 233: Pre-processing unit, 234: Gradient distribution generation unit, 236: Abnormality determination unit, 238: Output unit, 240: Storage unit

The invention claimed is:

1. An abnormality detection device, the abnormality detection device comprising:

one or more processors; and a memory storing instructions that, when executed by the one or more processors, cause the one or more processors to implement:

an image input unit for inputting an input image of an abnormality detection target object;

a gradient distribution generation unit for dividing the input image into predetermined regions and generating, for each region, a gradient distribution that indicates a distribution of a luminance gradient direction of the region; and an abnormality determination unit for determining a presence or absence of an abnormality by analyzing the gradient distribution generated for each region, wherein the abnormality detection target object includes a periodic pattern, and wherein the gradient distribution generation unit divides the input image into regions having a size in which at least one period of the periodic pattern is contained in each region.

2. The abnormality detection device according to claim 1, wherein the abnormality determination unit:

detects, from among each of the gradient distributions generated for each of the regions, a gradient direction that satisfies a predetermined frequency criterion as a distribution peak; and determines the presence or absence of an abnormality based on the distribution peak that was detected and a predetermined abnormality threshold set in advance.

3. The abnormality detection device according to claim 1, wherein the abnormality determination unit:

generates an average gradient distribution by averaging each gradient distribution generated for each of the regions;

detects, in the average gradient distribution, a gradient direction that satisfies a predetermined frequency criterion as a distribution peak; and determines the presence or absence of an abnormality based on the distribution peak that was detected and a predetermined abnormality threshold set in advance.

4. The abnormality detection device according to claim 1, wherein the abnormality determination unit:

extracts, from among each of the gradient distributions generated for each of the regions, a first gradient distribution corresponding to a first region and a second gradient distribution corresponding to a second region adjacent to the first region;

determines a distribution divergence between the first gradient distribution and the second gradient distribution by comparing the first gradient distribution and the second gradient distribution; and determines the presence or absence of an abnormality based on the determined distribution divergence and a predetermined distribution divergence threshold set in advance.

5. The abnormality detection device according to claim 1, wherein the abnormality determination unit further includes:

an output unit for outputting, in a case that an abnormality is determined by the determination of the presence or absence of an abnormality by the abnormality determination unit, an abnormality notification that includes an image indicating a region determined to be abnormal.

6. The abnormality detection device according to claim 1, wherein the one or more processors further implement a pre-processing unit to perform grayscale conversion on an area of the input image, and wherein any existing technique is used for the grayscale conversion.

7. The abnormality detection device according to claim 1, wherein the one or more processors further implement a pre-processing unit to perform contrast-correction on the image to enhance visibility of the image by enhancing brightness and darkness of the image and making shading clearer, and wherein contrast correction is skipped in cases where computing resources are limited.

8. The abnormality detection device according to claim 1, wherein the size of the region to include one or more periods of a design of the abnormality detection target object within the region.

9. The abnormality detection device according to claim 1, wherein the abnormality determination unit detects a distribution peak in the gradient distribution, wherein:

the distribution peak refers to a gradient angle having a highest frequency in the gradient distribution; and a gradient angle that satisfies a predetermined frequency criterion is identified as the distribution peak from among respective gradient distributions generated for each region.

10. The abnormality detection device according to claim 1, wherein an average gradient distribution is generated by averaging respective gradient distributions generated for each region, and a gradient that satisfies a predetermined frequency criterion is detected as a distribution peak in the average gradient distribution.

11. The abnormality detection device according to claim 1, wherein an abnormality degree of each region is a value indicating a divergence degree of the gradient distribution of a specific region from a normal distribution.

12. The abnormality detection device according to claim 1, wherein an abnormality threshold value is a value defining a boundary line between normal and abnormal, and is set by a user, or is automatically determined by the abnormality determination unit based on previous abnormality determination data.

13. The abnormality detection device according to claim 1, wherein an abnormality notification includes:

an image indicating an abnormality degree calculated for each region in the input image;

an image that indicates the regions determined to be abnormal; and a heat map that aggregates a set of gradient distributions, and wherein, in the heat map, the abnormality degree of each region in the input image is indicated by a color gradation.

14. The abnormality detection device according to claim 1, wherein the abnormality determination unit extracts a gradient distribution corresponding to adjacent regions from among respective gradient distributions generated for each region, and wherein the abnormality determination unit extracts a first gradient distribution corresponding to a first region and a second gradient distribution corresponding to a second region adjacent to the first region.

15. The abnormality detection device according to claim 14, wherein the abnormality determination unit compares the gradient distributions of the adjacent regions and determines a distribution divergence degree of these gradient distributions, and wherein the distribution divergence degree is a value that indicates a distance of the gradient distributions, such that a larger distribution divergence degree of the gradient direction distribution indicates a larger difference from the gradient direction distribution of other regions.

16. The abnormality detection device according to claim 1, wherein the gradient direction of the luminance does not change when there is a change in brightness due to changes in weather, such that more robust abnormality detection than when using changes to luminance values or color as indices becomes possible.

17. The abnormality detection device according to claim 1, wherein the device is configured for inspections in environments where a fixed angle of view and fixed lighting conditions are guaranteed, and wherein the device is configured for visual inspection of infrastructure.

18. An abnormality detection method, the abnormality detection method comprising:

inputting an input image that indicates an abnormality detection target object;

dividing the input image into regions of a predetermined size and generating, for each region, a gradient distribution that indicates a distribution of a luminance-gradience direction of the region;

extracting, from among each of the gradient distributions generated for each of the regions, a first gradient distribution corresponding to a first region and a second gradient distribution corresponding to a second region adjacent to the first region;

determining a distribution divergence between the first gradient distribution and the second gradient distribution by comparing the first gradient distribution and the second gradient distribution;

determining a presence or absence of an abnormality based on the determined distribution divergence and a predetermined distribution divergence threshold set in advance; and outputting, in a case that an abnormality is determined by the determination of the presence or absence of an abnormality, an abnormality notification that includes an image indicating a region determined to be abnormal, wherein the abnormality detection target object includes a periodic pattern, and wherein the dividing of the input image includes dividing the input image into regions having a size in which at least one period of the periodic pattern is contained in each region.

19. An abnormality detection system comprising:

a sensor device for image capturing an abnormality detection target object and acquiring an input image that indicates the abnormality detection target object;

a client terminal for requesting abnormality detection processing with respect to the abnormality detection target object; and an abnormality detection device for performing abnormality detection processing with respect to the abnormality detection target object, wherein:

the sensor device, the client terminal, and the abnormality detection device are connected via a communication network; and the abnormality detection device includes:

one or more processors; and a memory storing instructions that, when executed by the one or more processors, cause the one or more processors to implement:

an image input unit for inputting the input image that indicates the abnormality detection target object from the sensor device;

a gradient distribution generation unit for dividing the input image into regions of a predetermined size and generating, for each region, a gradient distribution that indicates a distribution of a luminance gradient-direction of the region;

an abnormality determination unit for determining a presence or absence of an abnormality by analyzing the gradient distribution generated for each region; and an output unit for transmitting, in a case that an abnormality is determined by the determination of the presence or absence of an abnormality by the abnormality determination unit, an abnormality notification that includes an image indicating a region determined to be abnormal to the client terminal, wherein the abnormality detection target object includes a periodic pattern, and wherein the gradient distribution generation unit divides the input image into regions having a size in which at least one period of the periodic pattern is contained in each region.

* * * * *